(12) United States Patent
Godard et al.

(10) Patent No.: US 10,614,222 B2
(45) Date of Patent: Apr. 7, 2020

(54) VALIDATION OF SECURITY MONITORING THROUGH AUTOMATED ATTACK TESTING

(71) Applicant: Microsoft Technology Licensing, LLC, Redmond, WA (US)

(72) Inventors: Benjamin J. Godard, Carnation, WA (US); Art Sadovsky, Redmond, WA (US); Travis W. Rhodes, Ravensdale, WA (US); David A. Marshall, Bellevue, WA (US); Richard A. Lundeen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 15/438,435

(22) Filed: Feb. 21, 2017

(65) Prior Publication Data

US 2018/0239902 A1  Aug. 23, 2018

(51) Int. Cl.
*G06F 21/57* (2013.01)
*G06F 21/53* (2013.01)
(Continued)

(52) U.S. Cl.
CPC ............ *G06F 21/577* (2013.01); *G06F 21/53* (2013.01); *G06F 21/552* (2013.01); *H04L 63/1433* (2013.01); *G06F 2221/034* (2013.01)

(58) Field of Classification Search
CPC .................................................. G06F 21/577
(Continued)

(56) References Cited

U.S. PATENT DOCUMENTS 8,214,904 B1 *  7/2012  Doukhvalov ........... G06F 21/56
                                                        726/24
8,925,088 B1 * 12/2014  Wilhelm ............... G06F 21/561
                                                        726/24
(Continued)

FOREIGN PATENT DOCUMENTS

CN      103401843 A    11/2013
WO      2016172151 A1  10/2016

OTHER PUBLICATIONS

"International Search Report and Written Opinion Issued in PCT Application No. PCT/US18/018084", dated May 22, 2018, 11 Pages.

(Continued)

*Primary Examiner* — Khalil Naghdali
(74) *Attorney, Agent, or Firm* — Schwegman Lundberg & Woessner, P.A.

(57) ABSTRACT

Systems, devices, and methods of an automatic attack testing framework for the security testing of an operational service are disclosed. In an example, such systems, devices, and methods may include operations that: deploy command instructions and a payload for a bot process to a computing device located within a target infrastructure, with the command instructions being selected based on criteria to test a security feature in the target infrastructure with an automated attack action in the bot process, and with the bot process being executed on the computing device and being started with use of the command instructions and the payload; communicate with the computing device to control the automated attack action within the target infrastructure, such that the automated attack action is performed within the bot process; and obtain results of the automated attack action performed within the bot process from the computing device.

19 Claims, 6 Drawing Sheets

(51) Int. Cl.
*G06F 21/55* (2013.01)
*H04L 29/06* (2006.01)

(58) Field of Classification Search
USPC .......................................................... 726/25
See application file for complete search history.

(56) References Cited

U.S. PATENT DOCUMENTS

| | | | |
|---|---|---|---|
| 8,997,224 B1 | 3/2015 | Lu et al. | |
| 9,258,314 B1* | 2/2016 | Xiao | H04L 63/1433 |
| 9,357,397 B2 | 5/2016 | Suarez Garcia et al. | |
| 9,384,345 B2* | 7/2016 | Dixon | G06F 21/50 |
| 9,438,625 B1* | 9/2016 | Yang | H04L 63/1441 |
| 9,781,160 B1* | 10/2017 | Irimie | H04L 63/1483 |
| 2009/0288150 A1* | 11/2009 | Toomim | G06F 21/6218 726/5 |
| 2013/0097699 A1* | 4/2013 | Balupari | G06F 21/552 726/22 |
| 2014/0046645 A1* | 2/2014 | White | G06F 17/509 703/13 |
| 2015/0026472 A1* | 1/2015 | Sweet | H04L 63/0428 713/168 |
| 2016/0044057 A1 | 2/2016 | Chenette et al. | |
| 2016/0191551 A1* | 6/2016 | Beauchesne | G06F 17/30525 726/23 |
| 2016/0306979 A1 | 10/2016 | Kotler et al. | |
| 2017/0013008 A1 | 1/2017 | Carey et al. | |
| 2018/0198821 A1* | 7/2018 | Gopalakrishna | H04L 63/1491 |

OTHER PUBLICATIONS

"Cloud-Based DDoS Attack Platform", https://www.nimbusddos.com/cloud-based-ddos-attack-platform.htm, Retrieved on: Nov. 30, 2016, 3 pages.

"Documentation", https://www.vthreat.com/documentation/, Retrieved on: Nov. 30, 2016, 12 pages.

"Vulnerability Analysis", http://www.pentest-standard.org/index.php/Vulnerability_Analysis, Published on: Aug. 16, 2014, 10 pages.

"Penetration Testing", https://www.agniinfo.com/white-papers/penetration-testing/, Published on: 2015, 7 pages.

Futoransky, et al., "Simulating Cyber-Attacks for Fun and Profit", In Proceedings of the 2nd International Conference on Simulation Tools and Techniques, Mar. 2, 2009, 9 pages.

Spring, Tom, "Windows Atom Tables Can Be Abused for Code Injection Attacks", https://threatpost.com/windows-atom-tables-can-be-abused-for-code-injection-attacks/121589/, Published on: Oct. 27, 2016, 13 pages.

Higgins, Kelly Jackson, "Startup Offers Free Cyberattack Simulation Service", http://www.darkreading.com/attacks-breaches/startup-offers-free-cyberattack-simulation-service/d/d-id/1323382, Published on: Feb. 12, 2015, 8 pages.

* cited by examiner

VALIDATION OF SECURITY MONITORING THROUGH AUTOMATED ATTACK TESTING

BACKGROUND

The identification and correction of security vulnerabilities is a large area of research and investigation in information security. In particular, many resources are expended to protect the data and services that are hosted by cloud services and network-connected information providers. Various approaches are currently used to identify security vulnerabilities and issues in network-accessible software applications and services, with the goal to identify correct the vulnerabilities and issues before they can be exploited by a malicious actor. However, existing security testing and security verification techniques are often insufficient to stay ahead of all malicious actors.

For example, security verification of a service or infrastructure may be performed manually with a penetration testing team, commonly referred to as a "red team", in contrast to a "blue team" that attempts to protect the service and patch vulnerabilities. Red teams may develop scenarios to exploit known vulnerabilities and find new vulnerabilities that a malicious attacker might use to compromise the service, to simulate real-life incidents so that the blue team can exercise incident response and detection. Further, red teams often expend resources to develop and identify stealthier ways of running malicious code onto target boxes. However, due to the manual nature of penetration testing, and the large amount of resources and expertise needed to successfully deploy simulated attacks, security testing performed by red teams may occur infrequently.

SUMMARY

Various details for the embodiments of the inventive subject matter are provided in the accompanying drawings and in the detailed description text below. It will be understood that the following section provides summarized examples of some of these embodiments.

Embodiments described herein generally relate to security monitoring and testing implemented within computing systems and networks and in particular, to the processing and analysis of security measures through the coordination and monitoring of automated cyber-attacks from distributed computing devices. In an example, embodiments may include electronic operations that: deploy command instructions and a payload for a bot process to a target computing device located within a target infrastructure, with the command instructions being selected based on criteria to test a security feature in the target infrastructure with an automated attack action in the bot process, and with the bot process being executed on the target computing device and being started with use of the command instructions and the payload; communicate with the target computing device to control the automated attack action within the target infrastructure, such that the automated attack action is performed within the bot process, and obtain results of the automated attack action performed within the bot process from the target computing device.

In a further example, the electronic operations may further deploy a communication configuration to the target computing device, such that the communication configuration is used to communicate a network location to enable the target computing device to obtain the command instructions and the payload. Also in a further example, the command instructions deployed to the target computing device define a life span of the bot process, an identifier of the bot process, and information to securely communicate with the computing device, such that the automated attack action is designated for performance by the target computing device based on the identifier of the bot process. Also in a further example, the automated attack action is included in a set of automated attack actions of a scenario, and the scenario is initiated by the computing device in a recurring, automated fashion. Also in a further example, the automated attack action is performed with a remote access toolkit selected from a library of toolkits.

An embodiment discussed herein includes a computing device including processing hardware (e.g., a processor) and memory hardware (e.g., a storage device or volatile memory) including instructions embodied thereon, such that the instructions, which when executed by the processing hardware, cause the computing device to implement, perform, or coordinate the electronic operations. Another embodiment discussed herein includes a computer program product, such as may be embodied by a machine-readable medium or other storage device, which provides the instructions to implement, perform, or coordinate the electronic operations. Another embodiment discussed herein includes a method operable on processing hardware of the computing device, to implement, perform, or coordinate the electronic operations.

As discussed herein, the logic, commands, or instructions that implement aspects of the electronic operations described herein, may be provided in a configuration service computing system, a command and control ("C2") computing system, or an attack deployment computing system. Another embodiment includes the incorporation of the techniques discussed herein into other forms, including into other forms of programmed logic, hardware configurations, or hardware-implemented components or modules, including an apparatus with respective means to perform the functions of such techniques. The respective algorithms used to implement the functions of such techniques may include a sequence of some or all of the electronic operations described above, or other aspects depicted in the accompanying drawings and detailed description below.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, and related apparatuses are disclosed for automated attack testing of a target, to perform simulated cyber-attack scenarios and actions against a target such as servers in a cloud service. In the following examples, the simulated cyber-attacks may be implemented with an attack testing framework that orchestrates controlled cyber-attack testing actions. The attack testing framework may implement a set of actions that an attacker might be able to perform, and the attack testing framework may utilize controlled processes to perform any of these actions against infrastructure, data services, processes, and interfaces that make up the cloud service. The attack testing framework may launch such automated attack actions to validate the cloud service's cyber defenses, by measuring how well the cloud service is able to detect and respond to, or even resist, simulated attacks.

As discussed in the following examples, the use of the attack testing framework may provide an organized, repeatable, and simple-to-implement attack instructions that may be used to validate the defenses of a number of types of computing systems (including a cloud service that includes many servers and operational subsystems). The attack testing framework may be used to regularly generate simulated cyber-attacks that provide critical information for verifying the readiness of defensive measures. The techniques discussed herein enable this kind of controlled simulation, using processes launched in an unpredictable manner, while still being constrained to prevent compromising sensitive data or destructive actions of the target system. Further, the techniques discussed herein provide a simple-to-launch and repeatable approach for generating simulated and coordinated attack scenarios, which can allow system administrators to test defensive measures and verify changes to infrastructure much more frequently and accurately with prior manual approaches.

In an example, the attack testing framework performs actions through the use of "bot" processes operating on respective machines in a target infrastructure. In an example, a bot process is a particular process that is started and operated under the control of an external director or master, such as a command and control service. In an example, a bot process starts, executes, and ends functions under the control of the command and control service. In a further example, a machine that implements a bot process is a "zombie" machine. In still a further example, multiple bot processes may be implemented within a particular zombie machine. In an example, a zombie machine may be part of a distributed "botnet" or a similar coordinated group of networked computers.

Figure 1:
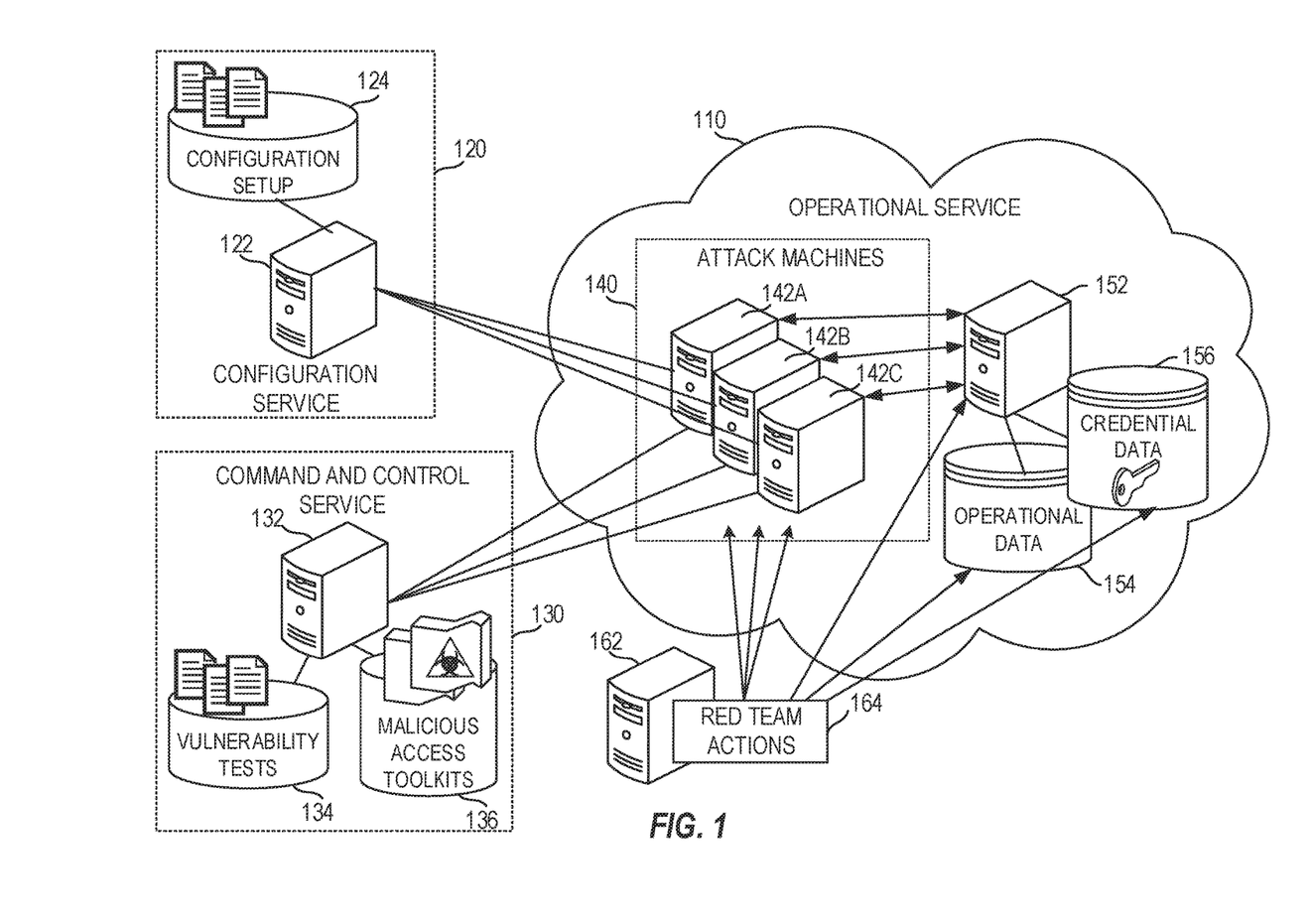
FIG. 1 illustrates an overview of configuration and control services used for implementing automated attack testing of an operational service, according to an example.

FIG. 1 provides an overview of example configuration and control services used for implementing automated attack testing of an operational service 110. As shown in FIG. 1, the operational service 110 may include a processing system 152 (e.g., a computing device) in coordination with databases and stored data such as provided with operational data 154 and credential data 156. Additionally, the operational service 110 may include additional processing units (e.g., server computing devices operating as attack deployment machines 142A, 142B, 142C) used to host or process data and operations of the operational service 110.

As discussed in the following scenarios, the processing units (e.g., attack deployment machine 142A, 142B, 142C) are coordinated as a set of attack machines 140 by use of an attack testing framework to launch malicious actions from within the operational service 110, such as would be used in a scenario where a malicious actor (e.g., hacker, rogue employee) obtained entry to the operational service 110. Thus, the attack testing framework may launch attacks from an internal processing unit from within the operational service 110, as it attempts to launch further attacks and exploits to the operational data 154, the credential data 156, or the processing system 152. The configuration of the attack machines 140 to operate in this fashion may be deliberately designed and programmed by a system administrator who attempts to simulate attack operations from among a set of compromised systems.

In an example, an attack testing framework includes the use of a configuration service 120 and a command and control service 130 to coordinate automated and simulated attacker actions on the operational service 110 via processing machines (e.g., attack deployment machines 142A, 142B, 142C, in the set of attack machines 140). As discussed further below, the configuration service 120 may operate on a configuration service computing system 122 to provide a configuration, initialization, or setup of an attack scenario for the attack machines 140, according to the characteristics of configuration setup data 124, which may be defined in a deployed script or command set. As also discussed further below, the command and control service 130 may operate on a computing device (e.g., server computing system 132) to provide configuration and coordination of automated malicious actions through bot processes launched among the attack machines 140. The command and control service 130 may execute the automated malicious actions based on vulnerability test data 134 that defines scenarios or objectives, malicious access toolkits 136, and other constraints and rules. Although the environment of FIG. 1 depicts the configuration service 120 and the command and control service 130 operating as separate services and on separate machines, it will be understood that the electronic functions and capabilities of the services 120, 130 may be integrated onto a single computing location or as a single service.

The attack testing framework operates the configuration service 120 and the command and control service 130 to setup and execute simulated attacks against a target service, such as features of the operational service 110. The attacks may include a sequence of multiple attacks that are provided in an attack scenario, such as a set of malicious actions that start from within a first processing unit (e.g., attack deployment machine 142A), spread to another processing system (e.g., processing system 152), or even spread to other data sources (e.g., operational data 154 or credential data 156). Thus, the attack actions may include one action, multiple actions, coordinated actions, or multiple coordinated or uncoordinated actions launched by scenarios. A non-limiting set of attack actions may include: stealing passwords, changing account access permissions, faking or changing data, removing data, or any other similar type of non-authorized, unintentional actions.

The techniques of the attack testing framework discussed herein may be complementary to the manual activity performed by red teams, such as shown in FIG. 1 by red team actions 164 launched from a red team computing system 162 against respective processing units (e.g., attack deployment machines 142A. 142B, 142C), the processing system 152, the operational data 154, or the credential data 156. Because the deployment of manual testing resources from a red team is resource intensive, involving skilled users, the demand for red team services may exceed the resource supply of users.

The penetration test actions that are performed by a red team represent potential human attacker behavior and may be used in combination with the attack testing framework for verifying the readiness of a system's defenses. However, it may be difficult to fully fix all issues from the last penetration test before the next one starts; likewise, if a fix is not realized to be ineffective until the next penetration, then the red team will be able to breach a system, thus causing another round of testing and delay. The use of attack testing framework may provide a repeatable approach for verifying results of certain attack scenarios at regular intervals that are not obtainable with red teams, including the testing of a particular scenario or set of scenarios on a weekly, daily, or hourly basis, or after configuration changes.

Manual penetration test actions by red teams also have an inherent limitation in that such actions attack a particular snapshot of a workload's state, at the point in time that the penetration test is launched. There may be numerous attacker opportunities due to configuration changes over time that are missed and undetected in the interim. The use of the attack testing framework enables a repeated yet varied deployment of attack attempts, in a fashion similar to unit testing of software. Unit testing, such as is used in typical software testing deployment, involves the repeated execution of unit tests against certain features and portions of a program, to verify that code can repeat an expected action. Unit testing may be used to find problems early, because the same unit tests are run after every commit or change, and any failed test can be pointed to a bug in the changed code or the test itself. Further, unit tests used in unit testing approach are often written against the possible and predicted actions of a typical user. In the same fashion, automated attack testing techniques may be deployed with the attack testing framework to replicate the actions of a typical attack user, such as hackers, rouge employees, or other malicious actors who attempt to perform unauthorized actions from compromised systems in the operational service 110.

The attack testing framework may perform unit tests and integration tests to simulate attacker behavior, such as defined actions an attacker would be expected to take inside an environment (e.g., the operational service 110). Additional examples of the malicious actions that may be defined in test scenarios might include, but are not limited, to: internal scanning and fingerprinting; stealing credentials; elevating privileges; lateral movement among systems; exploiting or exposing backdoors; exfiltration of data; and the like. These malicious actions may be incorporated into scenario scripts of the vulnerability test data 134 in order to recreate and reproduce actual attacker scenarios; these malicious actions also may be modular, to allow the incorporation of new tools and techniques for different types of malicious access toolkits 136.

Figure 2:
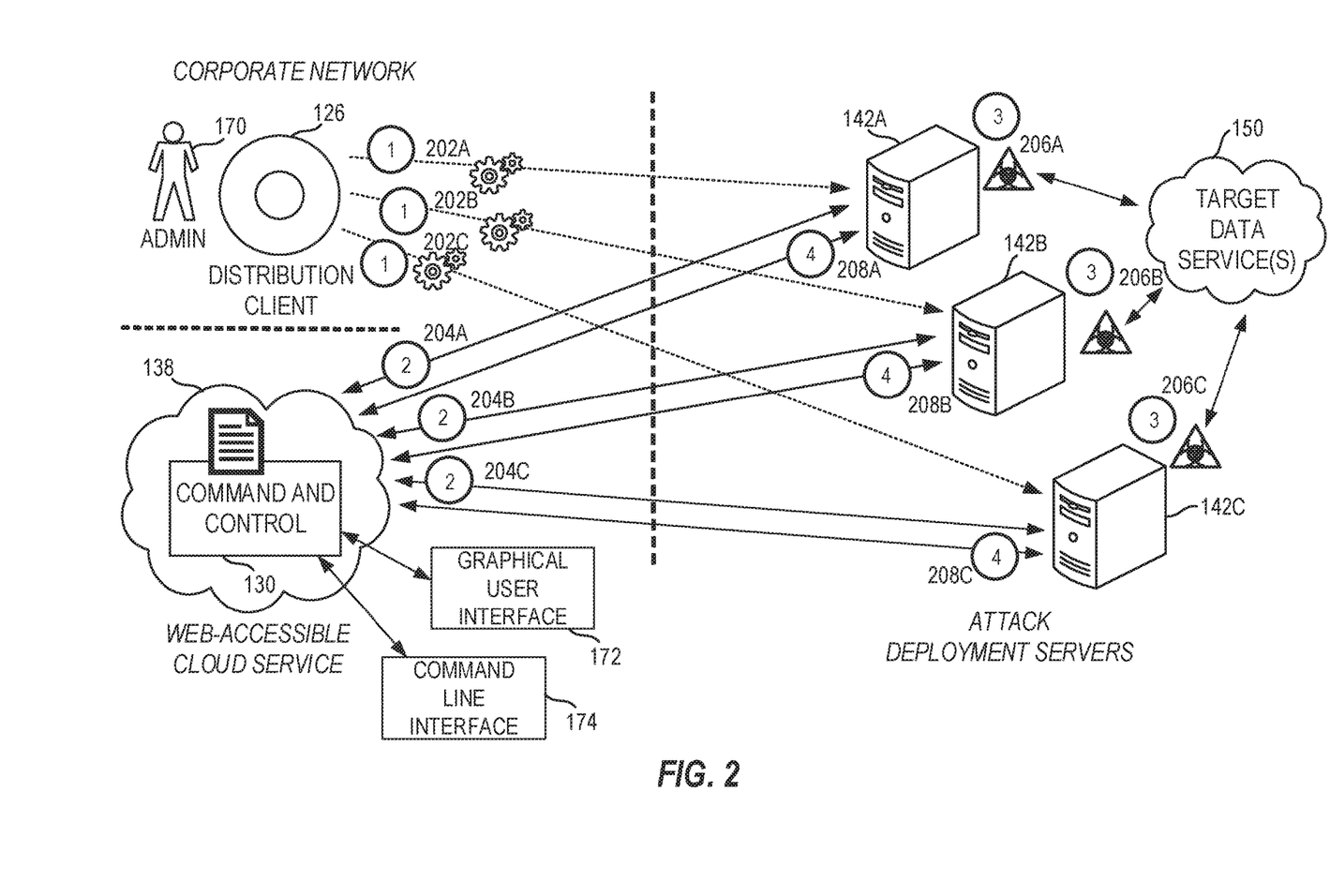
FIG. 2 illustrates an overview of operations for the command and control of attack deployment servers used for implementing automated attack testing of an operational service, according to an example.

FIG. 2 illustrates an overview of example operations for the command and control of attack deployment servers used for implementing automated attack testing of an operational service. As shown, components used for implementing the automated attack testing include a distribution client 126 operating under control of an administrator 170, the command and control service 130 operating within a web-accessible cloud service 138, and attack deployment servers (e.g. attack deployment machines 142A, 142B, 142C) operating within an operational service (e.g., the operational service 110 depicted in FIG. 1). The operational service is shown as including one or more target data services 150 that are subject to attack (e.g., as may be embodied by features of the processing system 152, the operational data 154, and the credential data 156 depicted in FIG. 1).

The automated attack testing runs directly against the target infrastructure itself, from within the operational service, which realistically simulates attacker behavior. The following scenario describes an example configuration deployed to the attack deployment machines 142A, 142B, 142C, instructing these servers to establish communications with the command and control service 130, and obtain a malicious payload at the attack deployment machines 142A, 142B. 142C. This malicious payload is used establish a bot process under the control of the command and control service 130, which in turn operates the bot process and attempt to perform malicious actions internally to the attack deployment machines 142A. 142B, 142C or to further infrastructure targets (e.g., the target data service 150).

FIG. 2 specifically illustrates an example automated attack testing initiated with a sequence of: configuration distribution actions (designated as "1"), command configuration actions (designated as "2"), bot process configuration actions (designated as "3"), and bot process operation actions (designated as "4") occurring among the distribution client 126, the command and control service 130, the attack deployment machines 142A. 142B, 142C, and the target data service(s) 150.

In an example, the configuration distribution actions (designated as "1") may be initiated by an administrator 170 utilizing a distribution client 126 to provide configuration scripts 202A, 202B. 202C to the respective attack deployment machines 142A, 142B. 142C. In an example, the configuration scripts 202A, 202B, 202C are provided as a powershell script, which appears innocuous (e.g., is an expected system configuration behavior that does not match patterns of known malware). This script may include unique identifiers to identify the respective attack deployment servers and a command that indicates how to identify and contact the command and control service 130. For example, the powershell script may command the respective attack deployment servers to perform a GET command on a web address provided for the command and control service 130.

In an example, the command configuration actions 204A, 204B, 204C (designated as "2") may include operations performed by the command and control service 130. The command and control service 130 may use the unique identifier of a contacting attack deployment server to determine if callback instructions should be sent back to the attack deployment server running the script (the powershell script). This is determined by the command and control service 130 evaluating a series of rules of varying precedence, to launch automated attack scenarios among specific chosen locations. For example, the rules may contain matching rules tied to scenarios that launch certain actions on specific boxes identified by unique identifiers. The command and control service 130 may provide callback instructions for establishing a secure connection, such as including an IP address. Port number, and SSL settings for the listener that should be contacted, and the scenarios that should be run once a bot process is established on the attack deployment server.

The command configuration actions may further invoke command steps with the command and control service 130 to facilitate control of bot processes among the attack deployment machines 142A, 142B, 142C. For example, scenario information may be combined with a unique identifier of the attack deployment server to create an identifier of a bot process launched on the specific attack deployment server (a bot process ID). The command instructions then may be communicated to the attack deployment server. As a specific example, if a matching rule is found, then the callback instructions, a .dll or other data used to launch a bot process, and the new bot process ID are hidden inside of a .jpg file and sent back to an attack deployment server. The attack deployment server then starts running this bot process .dll with the connection instructions that were sent. The command configuration actions thus result in a bot process being initiated, and to await further bot process configuration and operation (attack) operations on behalf of the command and control service 130.

In an example, the bot process configuration actions 206A, 206B. 206C (designated as "3") may include coordination of specific processes, such as in the processes used to initiate and operate a malicious access toolkit (e.g., a remote access toolkit). Once a bot process connects to the command and control server, the server looks at the bot process ID that is being used by the bot process and extracts the scenario information from that ID. The scenario information indicates which script or action should be executed for or by this bot process. These may include queue up commands, wait for commands to complete, and search the results of previously run commands.

In an example, the bot process operation actions 208A, 208B, 208C (designated as "4") include the operation of malicious actions against internal services of the attack deployment machines 142A, 142B, 142C, as instructed by the command and control service 130. In another example, the bot process operation actions include the operation of malicious actions against other services or data of the operational service (such as the target data service 150) as instructed by the command and control service 130. The results of any malicious actions may be communicated to the command and control service 130, via a secure connection. In further examples, the types and results of the malicious actions may be logged by the command and control service 130.

In a specific example of operation, a bot process connects with the command and control service 130, and queries the command and control service 130 for outstanding instructions. For example, if the command and control service 130 has instructions for a particular bot process, then the particular bot process queues the instructions up and attempts to complete all of the instructions, and if any of the instructions require a response then the particular bot process notifies the command and control service 130 that the instruction has completed and that there is output. Also for example, if the particular bot process cannot perform the instruction or does not understand the instruction, then no action is performed. In a further example, if one of the instructions provided to the particular bot process is to "burn" the process, then the particular bot process exits. Still in a further example, an expiration ("dead man") timer is set for the bot process as a mechanism to cause the particular bot process to exit its loop once the expiration timer expires.

In a further example, features of the attack testing framework may be exposed through user interfaces that allow control and definition by the administrator 170 for attack features, scenarios, and scheduling. For example, a user interface may include a graphical user interface 172 that allows a user to specify a new attack and target for the attack via the command and control service 130. As another example, a user interface may include a command line interface 174 that allows a user to initiate and combine with command line tools for triggering the attack against the target of choice via the command and control service 130. In a further example, the graphical user interface 172 may provide outputs for viewing results (e.g., logging) and diagnostics of simulated attack scenarios.

The use of the attack testing framework in repeated deployments may be used to verify security changes, updates, and investments in the infrastructure. Further, even malicious actions that are partially successful may be used to identify changes or configurations that make it easier for an attacker to operate and launch other types of attacks. For instance, in a scenario where network configurations such as a router rule has changed, the use of the attack testing framework can identify whether the changed network configuration has resulted in a greater security exposure or security holes that did not previously exist.

Figure 3:
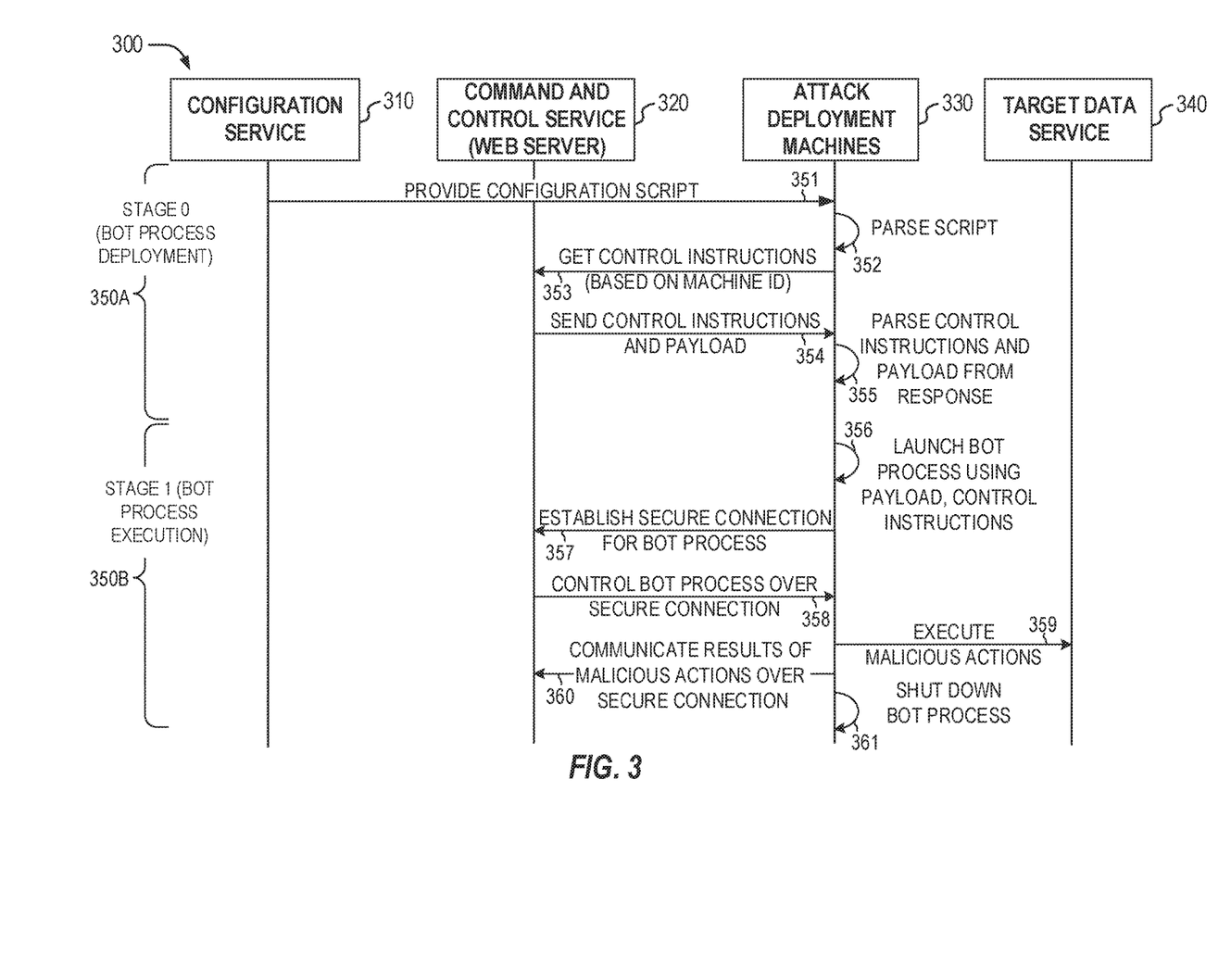
FIG. 3 illustrates a sequence of deployment and execution operations performed among a configuration service, a command and control service, and attack deployment machines, for implementing automated attack testing of a target service, according to an example.

FIG. 3 illustrates an example sequence of deployment and execution operations 300 performed among a configuration service 310, a command and control service 320, and attack deployment machines 330, for implementing automated attack testing of a target data service 340. Further to the example provided for FIG. 2 above, the sequence of operations 300 depicts the communication lifecycle that is facilitated among the respective services and systems, for "stage 0" deployment actions 350A (operations 351-355) and "stage 1" execution actions 350B (operations 356-361).

As shown, the stage 0 deployment actions 350A commence with the configuration service 310 providing a configuration script to the attack deployment machines 330 (operation 351). In an example, the configuration script may include a powershell script that resembles a normal operational action that would be executed on a deployment machine in the operational environment. The attack deployment machines 330 then may parse the script (operation 352) respectively to identify a network location of commands and data hosted by a command and control service 320. The script may also include an identifier assigned for the respective deployment machine to allow assignment and identification of which particular deployment machine has received the script. For example, execution of the powershell script may cause the respective attack deployment machines 330 to obtain attack instructions from the command and control service 320 (operation 353), such as via a GET command to an HTTP web service hosted by a web server.

The stage 0 deployment actions 350A further include the command and control service 320 sending attack instructions and a payload (operation 354) to the attack deployment machines 330, in response to the request for the attack instructions. The command and control service 320 determines its attack instructions for a particular machine based on evaluating a series of rules of varying precedence. The attack instructions may include callback information for establishing a subsequent secure connection for control of a bot process. The callback information may indicate an IP address, Port number, and encryption (e.g., secure sockets layer (SSL) settings for the listener that should be contacted on the command and control service 320. The attack instructions may also include the scenarios that should be run once a bot process is established on the respective attack deployment machine 330. For instance, if a matching rule is found for a particular deployment machine, then the connection instructions, the bot process instructions (e.g., a .dll), and the new bot process ID are hidden inside of a legitimate file format (e.g., .jpg) and sent back to the attack deployment machine 330.

In response to the control instructions and payload, the attack deployment machines 330 respectively parse the attack instructions and extract the payload from the response (operation 355). In an example, the attack deployment machines 330 include the receipt of instructions for executing a bot process, and the receipt of a malicious payload such as a remote access toolkit that allows the use of the bot process under the control of a remote agent (e.g., the command and control service 320). In some examples, some of the attack deployment machines receive no instructions or payload, in this case, no further execution occurs.

As shown, the stage 1 execution actions 350B commence with the launch of a bot process on the attack deployment machine 330 (operation 356) to be controlled by a scenario defined by the command and control service 320. The machine then starts running the bot process payload (e.g., a .dll, with malicious actions) based on the connection instructions that were sent to the particular deployment machine.

The stage 1 execution actions 350B continue by the attack deployment machine 330 establishing a secure connection to the command and control service 320 for operating bot actions (operation 357). This is followed by the control of actions in the bot process over the secure connection (operation 358), with the execution of malicious actions by the attack deployment machine 330 against a target data service 340 (operation 359).

For instance, after a bot process on one of the attack deployment machines 330 connects to the command and control service 320, the command and control service 320 evaluates the bot process ID that is being used by the bot process and extracts the scenario information based on the bot process ID. In a specific example operated on an attack deployment machine that is a Windows server, the scenario information may be used to indicate which AutoPwn script should be executed for this particular bot process. The AutoPwn script is a powershell script that uses a powershell API to queue up commands on the command and control server, wait for commands to complete, and search the results of previously run commands.

In response to the execution of the malicious action (operation 359), the attack deployment machine may obtain results of the bot process actions, and may determine if a particular malicious attack operation was successful or unsuccessful. The results of the malicious actions (including data obtained from a malicious action) may be communicated over the secure connection to the command and control service 320 (operation 360). Based on the results of the malicious actions, and the intended scenarios, further bot processes may be started, controlled, or stopped on the attack deployment machines 330. Multiple bot processes may also coordinate actions among each other. Finally, the bot process is shut down (operation 361). In an example, the bot process is defined to shut down automatically after a period of time. In another example, the bot process may be shut down in response to a command or scenario outcome.

An example of a scenario to control bot process actions, operated on an attack deployment machine that is a Windows server, may include coordinating operations between two bot processes similar to the following:

(1) Spin up first bot process on zombie machine (bot1)
(2) Run command to spin up a second bot process on the same zombie machine (bot2)
(3) Wait for command to complete
(4) Run command on bot2 process to dump all plaintext credentials stored in memory
(5) Wait for command to complete
(6) Search results of previous command for credentials for a specified list of accounts or account criteria such as type2 login, any account in NT SERVICE/, any credentials from an elevated session, etc.
(7) If credentials were found in the previous step then run a command on bot2 process to execute runas.exe with the credentials found previously. This creates an explicit login and should generate logs that may be detected.
(8) Shut down bot1 process and bot2 process The coordination of bot processes within a particular zombie machine of the attack deployment machines 330 may be facilitated by an identifier, the bot process ID, used to track the status of a bot process. Each time a new bot process is spun up, an explicit bot process ID may be supplied by the command and control service 320. Minimally, this bot process ID may include a globally unique identifier. In a further example, this bot process ID also contains scenario identifiers, so that a particular scenario (e.g., an AutoPwn scenario) corresponding to that identifier is run when the bot process calls back the first time. In this fashion, multiple scenarios may be chained together, and multiple bot processes may be orchestrated on a single deployment machine with one scenario. Likewise, in a similar fashion, scenarios may link multiple bot processes among multiple of the attack deployment machines 330.

In an example, the automated attack testing that is coordinated by the command and control service 320 operates to be knowledge-aware of its targets, to select appropriate targets and attack operations. For instance, the attack operations that are performed may be customized on whether certain types of operations are succeeding, or have a history of succeeding. The attack operations may also be customized to the characteristics of the target data service 340 or the characteristics of the attack deployment machines.

In an example, the automated attack testing tool is designed to be non-destructive and self-logging for verification. Further, the actions that are undertaken in the bot process are set to expire, and to not introduce a new vulnerability. The results and information exchanged between the command and the control service 320 and the attack deployment machines 330 may be encrypted over a secure connection to prevent interception or hijacking of the bot process. Further, activities performed by the bot process may be constrained to prevent unintended or runaway actions that might make it easier for an actual attacker to succeed or obtain sensitive data (or, to prevent inadvertently interrupting an operational service).

In some examples, the automated attack test may be used to formalize and integrate tools and techniques that a red team discovers from penetration tests. Also in other examples, a penetration test may be customized to attempt new malicious techniques after the automated testing has successfully run for some period of time; thus allowing known vulnerabilities to be corrected or patched before expending resources to new types of penetration tests.

Figure 4:
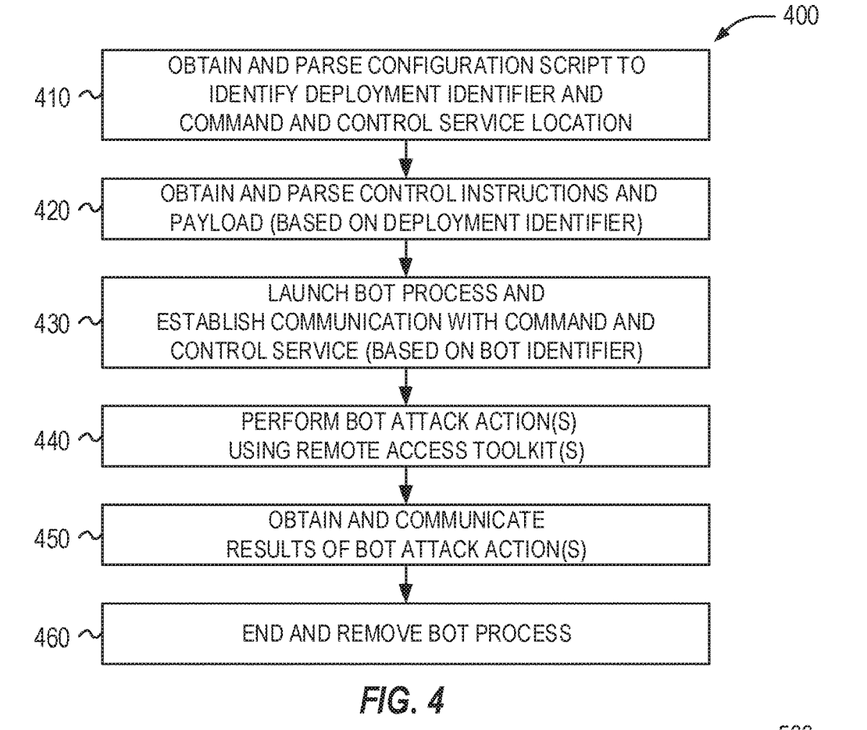
FIG. 4 illustrates a flowchart of operations performed by an attack deployment service, for launching automated attack testing of a target service using bot processes, according to an example.

FIG. 4 illustrates a flowchart 400 of example operations performed by an attack deployment service, for launching automated attack testing of a target service using bot processes. The following operations may be performed in combination or in addition to the attack deployment operations of the previously described examples, such as the stage 0 bot process deployment actions 350A or the stage 1 bot process execution actions 350B of the attack deployment machines 330 described above for FIG. 3.

As shown, an initial operation for the attack deployment service may include obtaining and parsing a configuration script, to identify a deployment identifier (e.g., a unique identifier) and a command and control service location (operation 410). For example, the deployment identifier may include a unique identifier assigned to the machine, and the location may include network address (e.g., URL) to access the command and control service. The operations for the attack deployment service continue to obtain and parse attack instructions and a payload, from the command and control service location, based on the deployment identifier provided to the attack deployment service (operation 420). In response to information received from the command and control service location (e.g., web service URL), the attack deployment service proceeds to launch a controllable (bot) process, and establishes a control connection to the command and control service (operation 430). In an example, the bot process communicates a bot process identifier, to allow the command and control service to identify and control that instance of the bot process based on the bot process identifier.

In response to the configuration established and communicated by the command and control service, the bot process operating on the attack deployment service performs one or more bot attack action(s) (operation 440). In an example, the bot attack actions are coordinated according to a scenario operated by the command and control service. Also in an example, the bot attack actions are performed using a remote access toolkit that is deployed between the command and control service and the bot process. The results of the attack actions from the bot process are obtained and communicated to the command and control service (operation 450). Further operations and control of the bot process may be dependent on the success or failure of a particular attack action, or the data obtained or action performed from the particular attack action. Finally, the bot process ends (e.g., in response to a command from the command and control service, or after an expiration of time), and the bot process is removed from the attack deployment service (operation 460). In an example, the bot process may be operated exclusively in volatile memory to prevent leftover traces of sensitive data from persisting after conclusion of the bot process.

Figure 5:
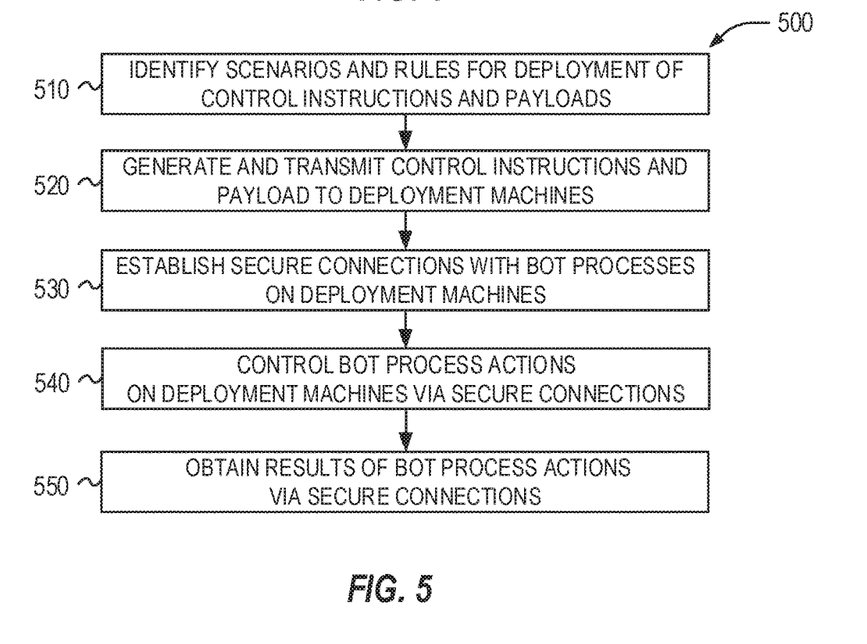
FIG. 5 illustrates a flowchart of operations performed by a command and control service, for controlling automated attack testing of a target service using bot processes, according to an example.

FIG. 5 illustrates a flowchart 500 of example operations performed by a command and control service, for controlling automated attack testing of a target service using bot processes. The following operations may be performed in combination or in addition to with the control and command operations of the previously described examples, such as the stage 0 bot process deployment actions 350A or the stage 1 bot process execution actions 350B of the command and control service 320 described above for FIG. 3.

As shown, the command and control service may operate to identify scenarios and rules for the deployment of attack instructions and payloads among multiple attack deployment machines, services, and bot processes (operation 510). As a further example, these scenarios and rules may be customized based on administrator inputs (e.g., by command line or graphical user interface (GUI) inputs). Attack instructions and payloads are generated for and transmitted to deployment machines based on the identified scenarios and rules (operation 520). For example, the attack instructions and payloads are communicated to respective deployment machines to spin up respective bot processes.

The command and control service continues to establish secure connections with the bot processes that have been launched on deployment machines (operation 530). The command and control service continues to control bot process actions on the deployment machines via the secure connections (operation 540). The command and control service concludes to obtain results of the bot process actions via secure connections (operation 550). In an example, the bot process is identified within the command and control service based on a bot process identifier. Based on success or failure, or specific data, obtained from the results of the malicious actions in the respective bot process(es), additional bot process actions, bot processes, and scenarios may be coordinated.

Figure 6:
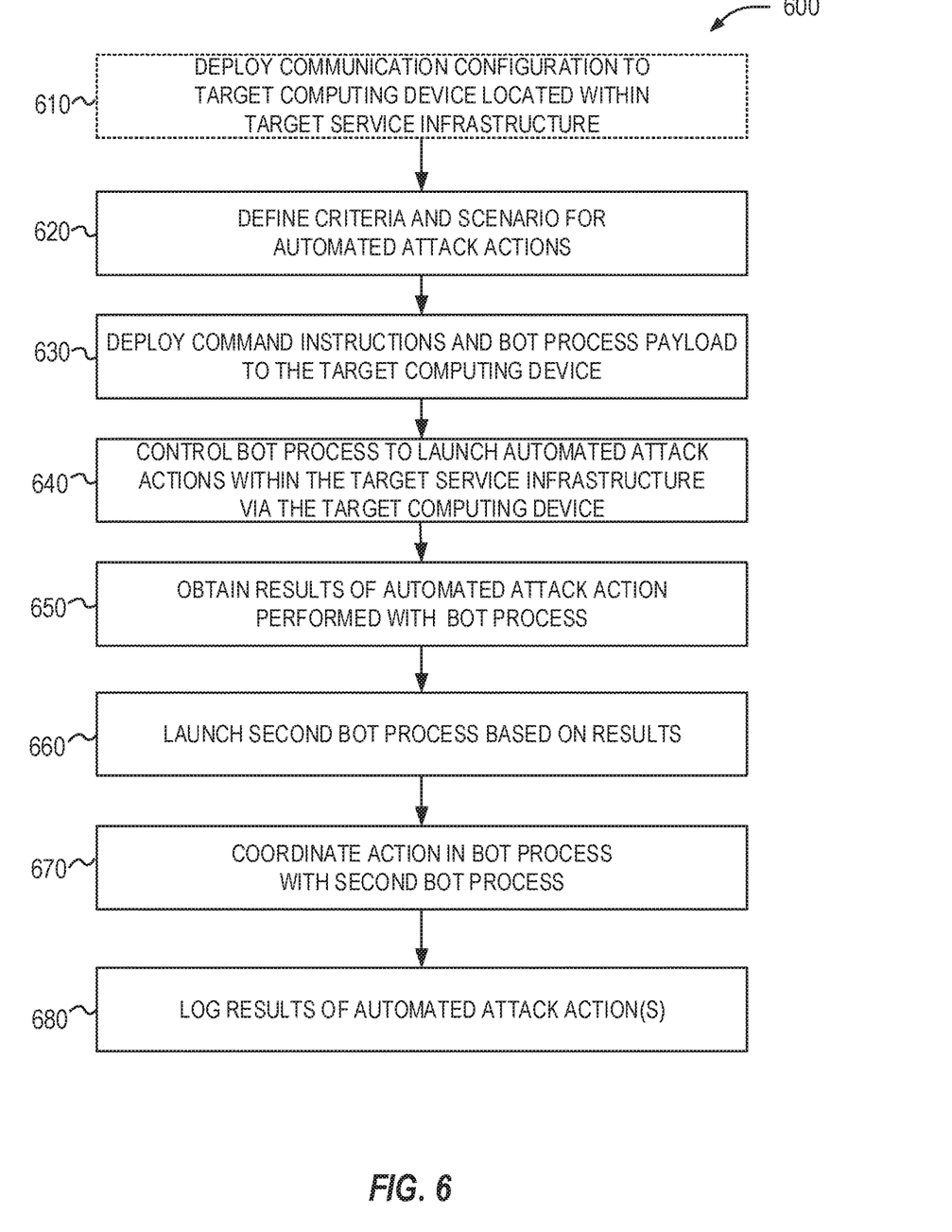
FIG. 6 illustrates a flowchart of a method for implementing automated attack testing within an automated attack framework, according to an example.

FIG. 6 is a flowchart 600 of an example method for implementing automated attack testing with an automated attack framework. It will be understood that the operations of the flowchart 600 may be implemented in connection with a computer-implemented method, instructions on a computer program product, or on a configuration of a computing device (or among multiple of such methods, products, or computing devices). In an example, the electronic operations are provided from a computing device that operates as a network-accessible server located outside of the target service infrastructure.

As shown, the operations the flowchart may commence with initial deployment of a communication configuration to a target computing device located within a target service infrastructure (operation 610). In an example, operations to deploy the communication configuration are used to communicate a network location to enable the target computing device to obtain the command instructions and the payload. In a further example, the communication configuration is provided in a script that is executable by the target computing device, such that execution of the script causes the target computing device to retrieve the command instructions and the payload from the network location. In a further example, the communication configuration may include deploying an indicator to the target computing device, such that the indicator is used to identify the target computing device among a plurality of target computing devices, and such that respective bot processes are deployed to the plurality of target computing devices based on the indicator.

The operations of the flowchart 600 may continue with definition of criteria and scenario for automated attack actions (operation 620). This definition may include the creation and selection of command instructions and a payload for a bot process. In an example, the command instructions defined to the target computing device indicate: a life span of the bot process, an identifier of the bot process, and information to securely communicate with the computing device. The payload generated for the bot process may include existing (e.g., third party) attack toolkits, such as forms of remote access toolkits.

The operations of the flowchart 600 continue with the deployment of the command instructions and the payload for a bot process to a target computing device located within a target service infrastructure (operation 630). In an example, the command instructions are selected based on criteria to test a security feature in the target service infrastructure with an automated attack action in the bot process. As explained herein, the bot process executes on the target computing device and is started with use of the command instructions and the payload. In a further example, the command instructions and the payload is embedded in an image file that is transmitted to the target computing device.

The operations of the flowchart 600 continue with communications transmitted to the target computing device to control the automated attack action within the target service infrastructure (operation 640). As explained herein, the automated attack action is performed within the bot process. In an example, the automated attack action is designated for performance by the target computing device based on the identifier of the bot process. Also in an example, the automated attack action is included as one of multiple automated attack actions of a scenario, such that the scenario is initiated by the computing device in a recurring, automated fashion. Also in an example, the automated attack action is performed with a remote access toolkit selected from a library of toolkits. The operations of the flowchart 600 continue to obtain results of the automated attack action performed within the bot process from the target computing device (operation 650).

In a further optional example, a command is provided to the target computing device to start a second bot process on the target computing device, such that the second bot process executes on the target computing device is started with use of the payload (operation 660). The information obtained from the second bot process may be used to perform a further automated attack action with the bot process. In a further example, an identifier of the bot process and an identifier of the second bot process are associated with a defined scenario, such that the bot process and the second bot process are used to coordinate automated attack actions of the defined scenario (operation 670).

The operations of the flowchart 600 conclude to log the results of the automated attack action(s) performed within the bot process(es) from the target computing device (operation 680).

In a further example, the target computing device is a server of a plurality of servers in the target service infrastructure, and respective command instructions and payloads are deployed to the plurality of servers. In this fashion, respective bot processes are launched among the plurality of servers, and the respective bot processes are used to perform additional automated attack actions respectively.

In some examples, the automated attack action is performed on services within the target computing system. In other examples, the automated attack action is performed on services in the target service infrastructure that are remote to the target computing system.

As discussed above, the automated attack techniques discussed herein may be distinguished from existing approaches for security vulnerabilities. For example, the techniques differ from Automatic Pwning (owning, attacking, pounding) features that simply re-run existing tools to use known exploits and breach the network. Rather, the automated attack techniques may be used from within an operational system to assume some level of breach, with an emphasis on what predictable malicious actions might be accomplished once the attacker is in. The automated attack techniques can also be distinguished from existing approaches for security scanning, which simply scan for known configurations and vulnerabilities. Thus, rather than being limited to the identification of misconfiguration, the automated attack techniques can generate dynamic and unpredictable attacker actions; and as a result of identifying vulnerabilities, detection mechanisms and patches may be tuned to identify and block the malicious actions.

In further examples, the automated attack techniques may be extended for use with machine learning scenarios. Machine learning scenarios hold potential for identifying and analyzing abnormal activity and vulnerability actions in a fashion that existing rules and human oversight cannot obtain. Machine learning processes consume labeled or classified data for training to learn characteristics particular outcomes. The attack deployment techniques discussed herein may be used to obtain labeled or classified data from automated attack actions, to help identify system activity that is associated with malicious activity, and train a machine learning process to identify when unexpected behavior is occurring. Further, by the use of the automated attack techniques in an environment where a breach is assumed, the machine learning algorithms may be used to develop analytics for detecting and responding to security considerations in a tainted environment.

Figure 7:
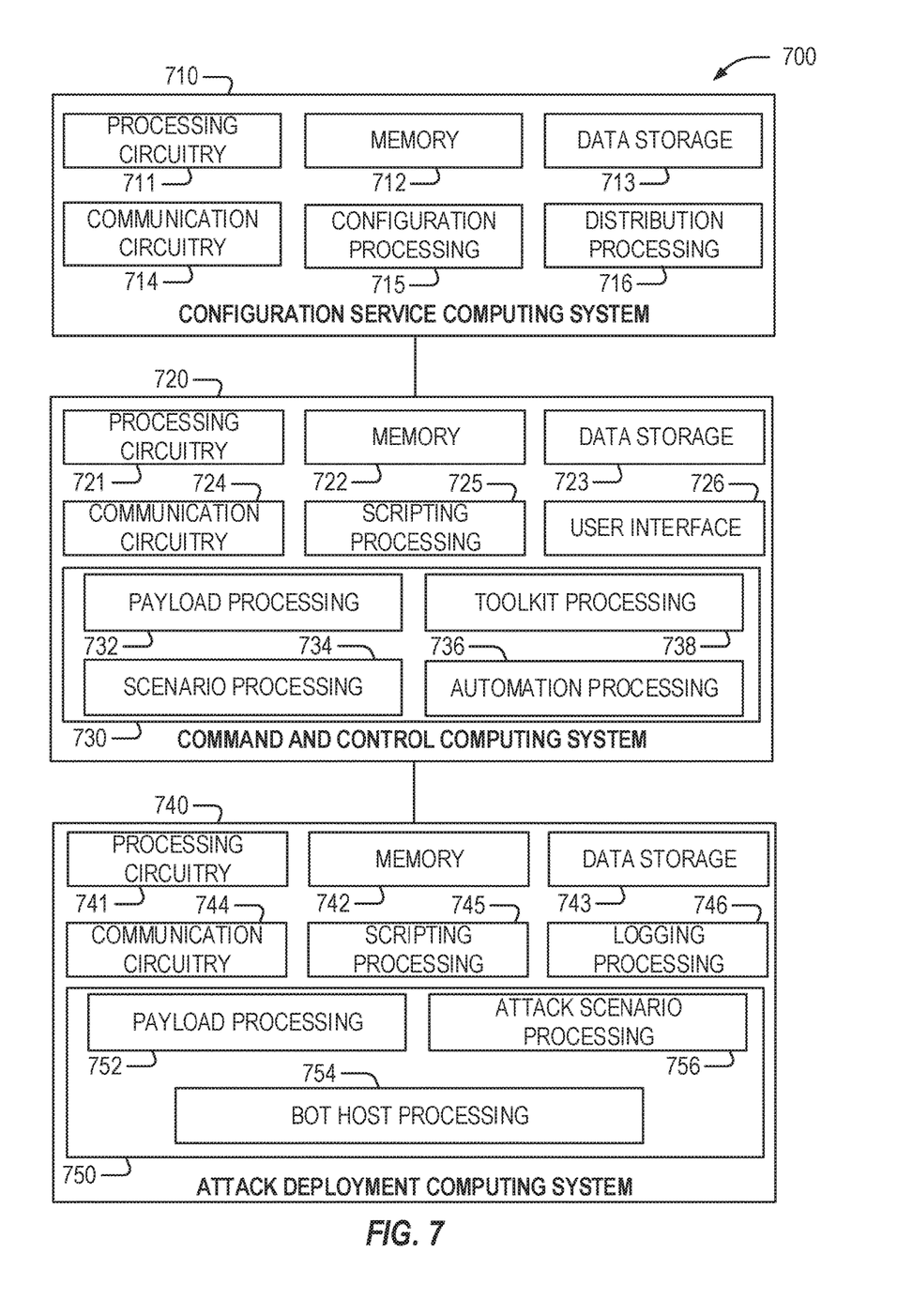
FIG. 7 illustrates a block diagram of hardware and functional components of a configuration service computing system, a command and control computing system, and an attack deployment computing system, to implement techniques for automated attack testing, according to an example.

FIG. 7 illustrates a block diagram 700 of example hardware and functional components of a configuration service computing system 710, a command and control computing system 720, and an attack deployment computing system 740, to implement techniques for automated attack testing of an operational service, such as are accomplished with the examples described above.

It will be understood, that although the configuration service computing system 710 and the command and control computing system 720 are depicted in FIG. 7 and in other drawings as separate systems and services, the features of these systems may be integrated into a single system or service (e.g., in a single server computing system). Further, although the attack deployment computing system 740 is depicted as a single computing system, it will be understood that its features may be distributed among one or multiple computing systems.

As shown, the configuration service computing system 710 includes: processing circuitry 711 (e.g., a CPU) and a memory 712 (e.g., volatile or non-volatile memory) used to perform electronic operations (e.g., via instructions) for use and operation of a configuration service (e.g., the configuration service 120 depicted in FIG. 1); data storage 713 to store scripts, instructions, and other data for operation and use of the configuration service; communication circuitry 714 to communicate with an external network or devices via wired or wireless networking components for the configuration service; configuration processing components or functionality 715 (e.g., circuitry or software instructions) used to establish and define the configuration settings (e.g., scripts) to a plurality of target machines (e.g., attack deployment computing systems), for operation of the configuration service in the attack testing framework; and distribution processing components or functionality 716 (e.g., circuitry or software instructions) used to distribute the configuration settings (e.g., scripts) to one or multiple target machines (e.g., attack deployment computing systems, such as attack deployment computing system 740) for operation of the configuration service in the attack testing framework.

As shown, the command and control computing system 720 includes: processing circuitry 721 (e.g., a CPU) and a memory 722 (e.g., volatile or non-volatile memory) used to perform electronic operations (e.g., via instructions) for use and operation of a command and control service (e.g., the command and control service 130 depicted in FIG. 1); data storage 723 to store executables, instructions, and other data for operation and use of the command and control service; communication circuitry 724 to communicate with an external network or devices via wired or wireless networking components for the command and control service; scripting processing components or functionality 725 (e.g., circuitry or software instructions) used to establish and define the control and command parameters (e.g., operating scripts) to a plurality of target machines (e.g., attack deployment computing systems), for operation of the command and control service in the attack testing framework; and a user interface 726 (e.g., provided via specialized hardware or software instructions) to output or facilitate an interactive command line or graphical user interface for control and operation of the command and control service.

The command and control computing system 730 is further depicted as including processing components 750 (e.g., circuitry or software instructions) for the command and control service, including payload processing 732 to generate or select command instructions or a payload (e.g., to generate command instructions for launching a bot process to a target computing device located within a target service infrastructure as described above for FIGS. 2-6); scenario processing 734 to define or deploy a defined scenario (e.g., a scenario to launch automated attack actions among bot processes as described above for FIGS. 2-6); automation processing 736 to launch attack actions in an automated manner (e.g., via control of a bot process as described above for FIGS. 2-6); and toolkit processing 738 to select and deploy a payload and attack operations (e.g., to distribute and control binaries and software for attack actions in a bot process as described above for FIGS. 2-6).

As shown, the attack deployment computing system 740 includes: processing circuitry 741 (e.g., a CPU) and a memory 742 (e.g., volatile or non-volatile memory) used to perform electronic operations (e.g., via instructions) for use and operation of an attack deployment computing system (e.g., the attack deployment machines 142A, 142B, 142C depicted in FIG. 1); data storage 743 to store executables, instructions, and other data for operation and use of the attack deployment computing system; communication circuitry 744 to communicate with an external network or devices via wired or wireless networking components for the command and control service; scripting processing components or functionality 745 (e.g., circuitry or software instructions) used to implement the control and command parameters (e.g., from operating scripts) used to identify and operate attack deployment operations for operation of the bot processes in the attack testing framework; and logging processing components or functionality 746 (e.g., circuitry or software instructions) used to monitor and record the results of automated attack actions.

The attack deployment computing system 740 is further depicted as including processing components 750 (e.g., circuitry or software instructions) for the attack deployment service, including payload processing 752 to execute and operate payloads (e.g., remote access toolkit payloads as shown as described above for FIGS. 2-6); attack scenario processing 756 to implement automated attack actions (e.g., to implement control instructions provided from a command and control service as described above for FIGS. 2-6); and bot host processing 754 to execute, operate, and terminate bot process operations (e.g., as provided in a payload for a bot process, and controlled by a command and control service, as described above for FIGS. 2-6).

As referenced above, the embodiments of the presently described electronic operations may be provided in machine or device (e.g., apparatus), method (e.g., process), or computer- or machine-readable medium (e.g., article of manufacture or apparatus) forms. For example, embodiments may be implemented as instructions stored on a machine-readable storage medium, which may be read and executed by a processor to perform the operations described herein. A machine-readable medium may include any non-transitory mechanism for storing information in a form readable by a machine (e.g., a computer). A machine-readable medium may include a single medium or multiple media (e.g., a centralized or distributed database, and/or associated caches and servers) that store the one or more instructions.

A machine-readable medium may include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. A machine-readable medium shall be understood to include, but not be limited to, solid-state memories, optical and magnetic media, and other forms of storage devices. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and optical disks. The instructions may further be transmitted or received over a communications network using a transmission medium (e.g., via a network interface device utilizing any one of a number of transfer protocols.

Although the present examples refer to various forms of cloud services and infrastructure service networks, it will be understood that may respective services, systems, and devices may be communicatively coupled via various types of communication networks. Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A, or other personal area, local area, or wide area networks).

Embodiments used to facilitate and perform the electronic operations described herein may be implemented in one or a combination of hardware, firmware, and software. The functional units or capabilities described in this specification may have been referred to or labeled as components, processing functions, or modules, in order to more particularly emphasize their implementation independence. Such components may be embodied by any number of software or hardware forms. For example, a component or module may be implemented as a hardware circuit comprising custom circuitry or off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. The executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as the command and control service) may take place on a different processing system (e.g., in a computer in a cloud-hosted data center), than that in which the code is deployed (e.g., in a test computing environment). Similarly, operational data may be included within respective components or modules, and may be embodied in any suitable form and organized within any suitable type of data structure. The operational data may be collected as a single data set, or may be distributed over different locations including over different storage devices.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing device, comprising:
   a processor; and
   a memory device including instructions embodied thereon, wherein the instructions, which when executed by the processor, configure the processor to perform electronic operations that:
   deploy command instructions and a payload for a bot process to a target computing device located within a target infrastructure, the command instructions having been selected based on at least one criterion, wherein the command instructions are configured to test a security feature in the target infrastructure with an automated attack action in the bot process, and wherein the bot process is configured to execute on the target computing device and is configured to start with use of the command instructions and the payload;
   communicate with the target computing device to control the automated attack action within the target infrastructure, wherein the automated attack action is configured to perform within the bot process;
   send a command to the target computing device, the command configured to initiate a second bot process on the target computing device, the second bot process configured to start using the payload that was deployed with the command instructions;
   obtain results of the automated attack action performed within the bot process from the target computing device; and
   validate the target infrastructure or identify a vulnerability within the target infrastructure based on the results of the automated attack action.

2. The computing device of claim 1, wherein the instructions configure the processor to perform further electronic operations that:
   deploy a communication configuration to the target computing device, wherein the communication configuration is used to communicate a network location to enable the target computing device to obtain the command instructions and the payload.

3. The computing device of claim 2, wherein the communication configuration is provided in a script that is executable by the target computing device, wherein execution of the script causes the target computing device to retrieve the command instructions and the payload from the network location.

4. The computing device of claim 1, wherein the command instructions deployed to the target computing device define a life span of the bot process, an identifier of the bot process, and information to securely communicate with the computing device, and wherein the automated attack action is designated for performance by the target computing device based on the identifier of the bot process.

5. The computing device of claim 1, wherein the instructions configure the processor to perform further electronic operations that:
   log the results of the automated attack action performed within the bot process from the target computing device.

6. The computing device of claim 1, wherein the target computing device is a server of a plurality of servers in the target infrastructure, wherein respective command instructions and payloads are deployed to the plurality of servers, wherein respective bot processes are started among the plurality of servers, and wherein the respective bot processes are used to perform additional automated attack actions respectively.

7. The computing device of claim 1, wherein the automated attack action is included in a set of automated attack actions of a scenario, and wherein the scenario is initiated by the computing device in a recurring, automated fashion.

8. The computing device of claim 1, wherein the automated attack action is performed with a remote access toolkit selected from a library of toolkits.

9. The computing device of claim 1, wherein an identifier of the hot process and an identifier of the second hot process are associated with a defined scenario, wherein the hot process and the second hot process are used to coordinate automated attack actions of the defined scenario.

10. A non-transitory device-readable storage medium, the device-readable storage medium including instructions that, when executed by a processor and memory of a computing device, causes the computing device to perform operations that:
   deploy command instructions and a payload for a bot process to a target computing device located within a target infrastructure, the command instructions having been selected based on at least one criterion, wherein the command instructions are configured to test a security feature in the target infrastructure with an automated attack action in the bot process, and wherein the bot process is configured to execute on the target computing device and is configured to start with use of the command instructions and the payload;
   communicate with the target computing device to control the automated attack action within the target infrastructure, wherein the automated attack action is configured to perform within the bot process;
   send a command to the target computing device, the command configured to initiate a second bot process on the target computing device, the second bot process configured to start using the payload that was deployed with the command instructions;
   obtain results of the automated attack action performed within the bot process from the target computing device; and
   validate the target infrastructure or identify a vulnerability within the target infrastructure based on the results of the automated attack action.

11. The device-readable storage medium of claim 10, wherein the command instructions deployed to the target computing device define a life span of the bot process, an identifier of the bot process, and information to securely communicate with the computing device, and wherein the automated attack action is designated for performance by the target computing device based on the identifier of the bot process.

12. The device-readable storage medium of claim 10, wherein the automated attack action is included in a set of automated attack actions of a scenario, and wherein the scenario is initiated by the computing device in a recurring, automated fashion.

13. The device-readable storage medium of claim 10, wherein the automated attack action is performed with a remote access toolkit selected from a library of toolkits.

14. The device-readable storage medium of claim 10, wherein the instructions further cause the computing device to perform operations that:
    wherein an identifier of the bot process and an identifier of the second bot process are associated with a defined scenario, wherein the bot process and the second bot process are used to coordinate automated attack actions of the defined scenario.

15. A method, comprising a plurality of electronic operations executed with a processor and memory of a computing device, the plurality of electronic operations including:
    deploying command instructions and a payload for a bot process to a target computing device located within a target infrastructure, the command instructions having been selected based on at least one criterion, wherein the command instructions are configured to test a security feature in the target infrastructure with an automated attack action in the bot process, and wherein the bot process is configured to execute on the target computing device and is configured to start with use of the command instructions and the payload;
    communicating with the target computing device to control the automated attack action within the target infrastructure, wherein the automated attack action is configured to perform within the bot process;
    sending a command to the target computing device, the command configured to initiate a second bot process on the target computing device, the second bot process configured to start using the payload that was deployed with the command instructions;
    obtaining results of the automated attack action performed within the bot process from the target computing device; and
    validating the target infrastructure or identify a vulnerability within the target infrastructure based on the results of the automated attack action.

16. The method of claim 15, wherein the command instructions deployed to the target computing device define a life span of the bot process, an identifier of the bot process, and information to securely communicate with the computing device, and wherein the automated attack action is designated for performance by the target computing device based on the identifier of the bot process.

17. The method of claim 15, wherein the automated attack action is included in a set of automated attack actions of a scenario, and wherein the scenario is initiated by the computing device in a recurring, automated fashion.

18. The method of claim 15, wherein the automated attack action is performed with a remote access toolkit selected from a library of toolkits.

19. The method of claim 15, the electronic operations further including:
    wherein an identifier of the bot process and an identifier of the second bot process are associated with a defined scenario, wherein the bot process and the second bot process are used to coordinate automated attack actions of the defined scenario.

* * * * *